United States Patent
Leadingham

(10) Patent No.: US 11,833,009 B2
(45) Date of Patent: Dec. 5, 2023

(54) ADJUSTABLE SYSTEM FOR MAGNETIC DENTURE RETENTION

(71) Applicant: Jeffrey L. Leadingham, Ashland, KY (US)

(72) Inventor: Jeffrey L. Leadingham, Ashland, KY (US)

(*) Notice: Subject to any disclaimer, the term of this patent is extended or adjusted under 35 U.S.C. 154(b) by 819 days.

(21) Appl. No.: 16/739,527

(22) Filed: Jan. 10, 2020

(65) Prior Publication Data
US 2020/0281695 A1 Sep. 10, 2020

Related U.S. Application Data

(60) Provisional application No. 62/813,295, filed on Mar. 4, 2019.

(51) Int. Cl.
*A61C 8/00* (2006.01)

(52) U.S. Cl.
CPC ............ *A61C 8/0081* (2013.01); *A61C 8/005* (2013.01); *A61C 8/0095* (2013.01)

(58) Field of Classification Search
CPC ..... A61C 8/0048; A61C 8/005; A61C 8/0056; A61C 8/0062–0069; A61C 8/0075; A61C 8/0081; A61C 8/0095; A61C 13/235; A61C 13/2255; A61C 8/0027; A61C 8/001; A61C 8/003; A61C 8/0005; A61C 8/0086;

(Continued)

(56) References Cited

U.S. PATENT DOCUMENTS 3,798,770 A * 3/1974 Mitchell .............. A61C 13/235
433/189
4,177,562 A * 12/1979 Miller .................. A61C 8/0089
433/174

(Continued)

FOREIGN PATENT DOCUMENTS

CN 102058440 * 5/2011
EP 1192916 A2 * 4/2002 ........... A61C 13/235

(Continued)

OTHER PUBLICATIONS

Lee, E., Shin, S-Y. The influence of the number and the type of magnetic attachment on the retention of mandibular mini implant overdenture. J Adv Prosthodont 2017; 9:14-21.

(Continued)

*Primary Examiner* — Edward Moran
*Assistant Examiner* — Matthew P Saunders
(74) *Attorney, Agent, or Firm* — Dickinson Wright PLLC; Nicholas P. Coleman

(57) ABSTRACT

An adjustable denture retention system may include an elongated baseplate configured for adjustable longitudinal positioning within a mouth of a patient. The baseplate may be adapted to magnetically engage a denture in order to retain the denture in place in the mouth without the use of an adhesive. The denture may include one or more magnets and the baseplate may include a ferromagnetic material. The system may include spacers for engaging permanent dental implants within the patient's mouth and for spacing the baseplate from the gingiva to promote dental hygiene. A number of spacers of different heights allows for an adjustable height of the baseplate above the gingiva regardless of the thickness of the gingiva.

14 Claims, 11 Drawing Sheets

(58) Field of Classification Search
CPC ....... A61C 8/0098; A61C 13/01; A61C 13/06; A61C 13/10; A61C 13/225
USPC .................. 433/171–174, 189, 199.1, 200.1
See application file for complete search history.

(56) References Cited

U.S. PATENT DOCUMENTS

| | | | | |
|---|---|---|---|---|
| 4,225,668 A * | 9/1980 | Bartoli | ................ | A61C 8/0048 433/176 |
| 4,741,698 A * | 5/1988 | Andrews | .............. | A61C 8/0075 433/173 |
| 4,915,629 A * | 4/1990 | Sellers | ................ | A61C 8/0086 433/173 |
| 4,976,739 A * | 12/1990 | Duthie, Jr. | ........... | A61C 8/0022 606/60 |
| 4,986,753 A * | 1/1991 | Sellers | ................ | A61C 8/0048 433/172 |
| 5,816,810 A * | 10/1998 | Antonson | .......... | A61C 13/0004 433/172 |
| 9,925,023 B2 | 3/2018 | Arai et al. | | |
| 10,188,488 B2 | 1/2019 | Montero et al. | | |
| 2004/0078040 A1* | 4/2004 | Feijtel | ................ | A61C 8/0048 433/173 |
| 2010/0055640 A1* | 3/2010 | Van Lierde | ............ | A61C 1/084 433/215 |
| 2010/0209874 A1* | 8/2010 | Auderset | ............. | A61C 8/0048 433/174 |
| 2018/0008383 A1 | 1/2018 | Schulter et al. | | |
| 2018/0280120 A1* | 10/2018 | Berger | ................ | A61C 13/235 |

FOREIGN PATENT DOCUMENTS

| | | | | |
|---|---|---|---|---|
| EP | 2106768 | * | 10/2009 | |
| EP | 2481372 | * | 8/2012 | |
| EP | 2481372 A1 * | | 8/2012 | ............. A61C 1/084 |
| EP | 2913023 A1 * | | 9/2015 | ........... A61C 8/0001 |
| FR | 2522495 | * | 9/1983 | |
| FR | 2611134 A1 * | | 2/1987 | |
| FR | 2915673 | * | 11/2008 | |
| IN | 201721022909 | | 9/2017 | |
| JP | 2001224604 | * | 8/2001 | |
| WO | WO-9325159 A1 * | | 12/1993 | ........... A61C 13/235 |
| WO | WO-2014013114 A1 * | | 1/2014 | ............... A61C 8/00 |
| WO | 2016161436 A1 | | 10/2016 | |
| WO | WO-2016203030 A1 * | | 12/2016 | ......... A61C 13/0001 |
| WO | 2017083922 A1 | | 5/2017 | |
| WO | 2019017933 A1 | | 1/2019 | |

OTHER PUBLICATIONS

Ishida, Y., et al., Case Report: Magnet-Retained Two-Mini-Implant Overdenture: Clinical and Mechanical Consideration. Dentistry Journal MDPI; 2016, 4, 35.

* cited by examiner

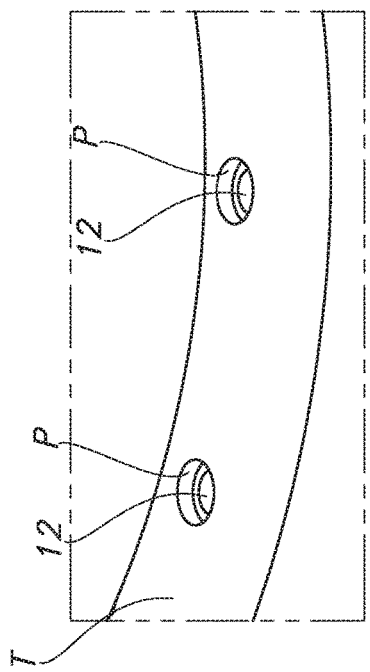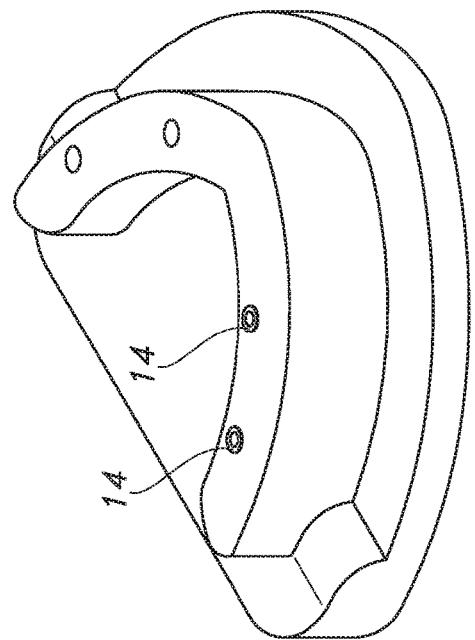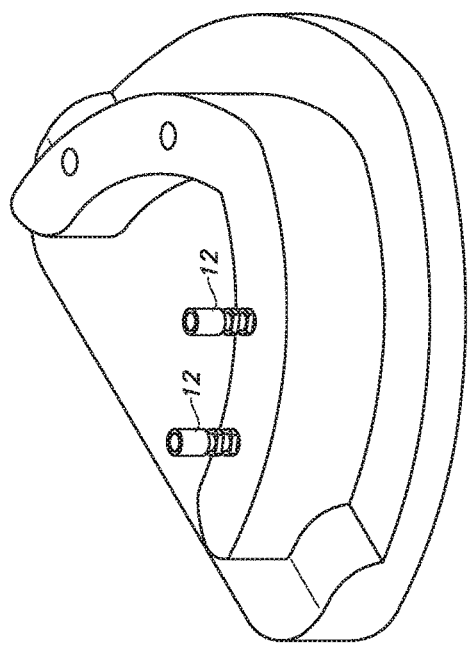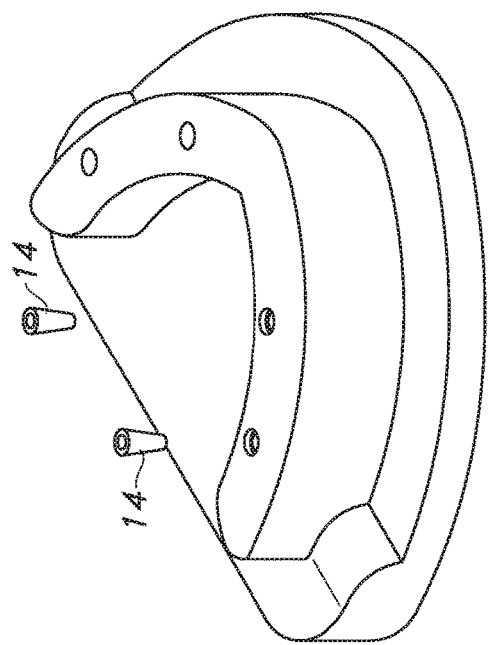

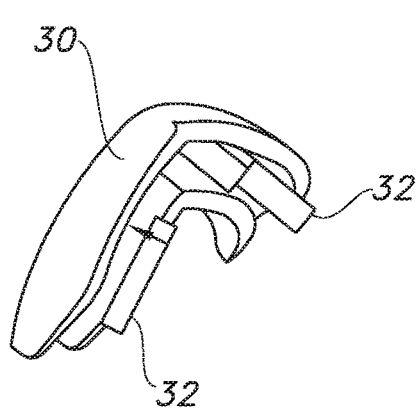
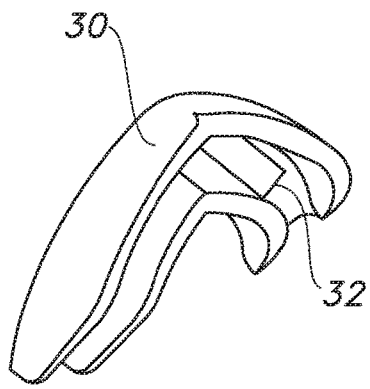
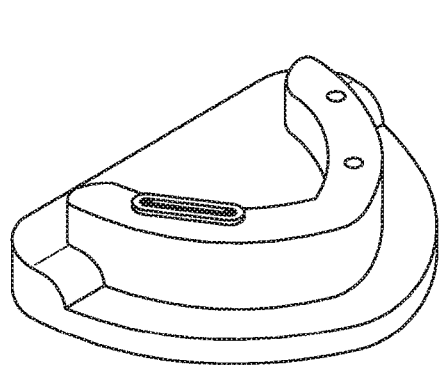
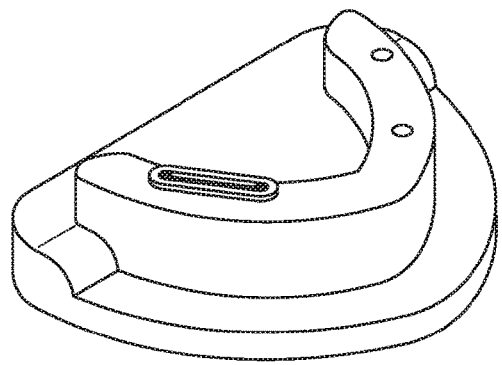
FIG. 2J          FIG. 2K
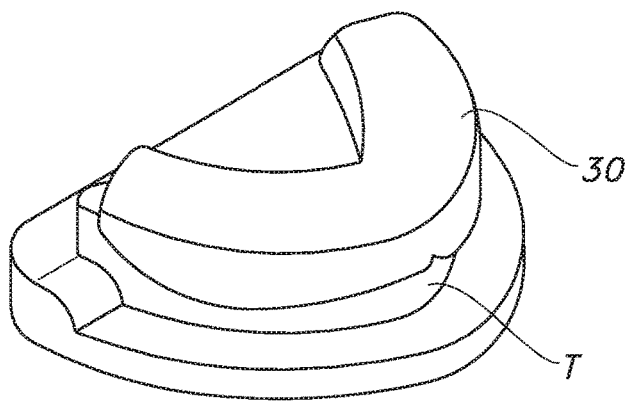
FIG. 2L

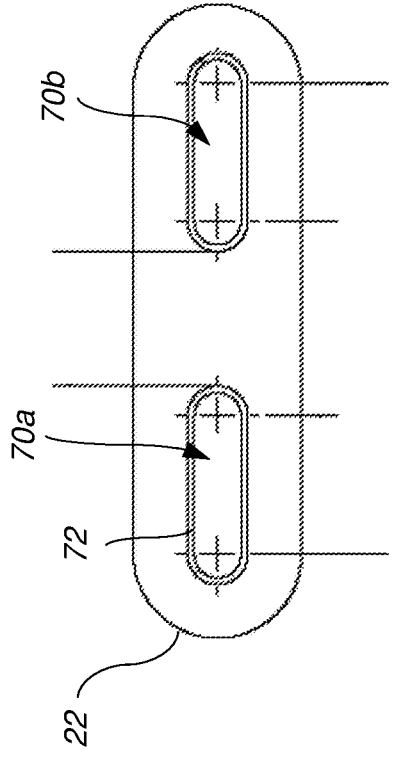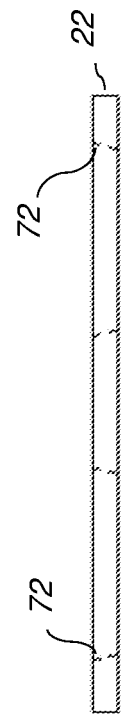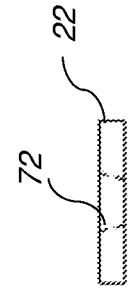
FIG. 7A
FIG. 7B
FIG. 7C
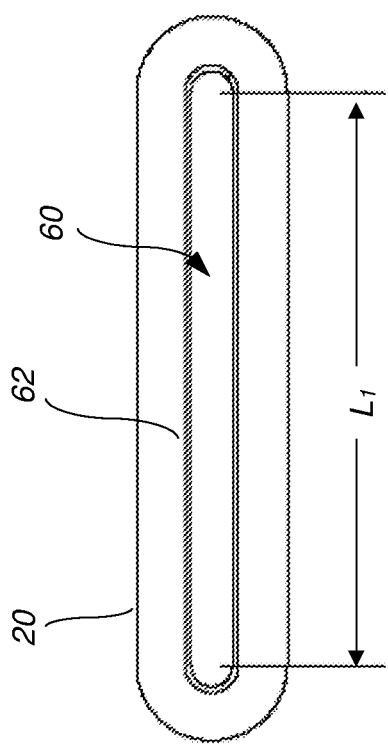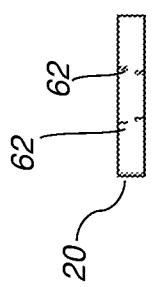
FIG. 6A
FIG. 6B
FIG. 6C

ADJUSTABLE SYSTEM FOR MAGNETIC DENTURE RETENTION

This application claims priority to U.S. PROVISIONAL Patent Application Ser. No. 62/813,295, filed Mar. 4, 2019, the disclosure of which is hereby incorporated by reference.

TECHNICAL FIELD

This invention generally relates to artificial removable dentures, and more particularly to a magnetic system for retaining dentures.

BACKGROUND OF THE INVENTION

The partial or total loss of a person's natural teeth, whether in the upper jaw or lower jaw, and whether due to age, illness, accident, or any other reason, may have a significant emotional and physical impact on the person's life. For example, the absence of teeth may cause functional problems relating to the inability to chew and speech difficulty. From a psychological or social standpoint, a full set of teeth is considered aesthetically desirable, and missing teeth may cause the person anxiety, depression, or other emotional suffering.

The use of dental prostheses in the form of dentures is a widely used method of replacing teeth for both aesthetic and physiological reasons. Dentures may be adapted or molded to fit an individual's alveolar arch, and in use, must be held in place by a fixing agent or system.

Because dentures are held against living tissue (i.e. the gingiva or gums), it may be advantageous for dentures to be removable. This allows for the underlying mouth tissue and/or any surrounding original teeth to be properly cleaned, thereby avoiding issues such as gingivitis. Accordingly, various fixing agents or systems may be used to hold the dentures in place during use, but which allow for dentures to be relatively easily removable for cleaning. For example, glues as well as mechanical and magnetic attachment systems have been implemented. In the case of mechanical or magnetic attachment systems, certain implanted elements may be used, in which a device is implanted into the person's underlying bone, and which may interact with the dentures in a way to retain the dentures in place.

While dentures can be precisely adapted to a person's alveolar arch, it is still difficult to hold the dentures in place. During normally chewing or speaking dentures may move out of position, which may result in speech difficulty, chewing problems, or discomfort for the user.

In addition, a given person's mouth may change physiological characteristics over time. For example, relatively thickness of the gingiva or gums may change over time with respect to underlying bone. Accordingly, in the case of a denture system using an implant, the gum level may rise or fall with respect to the implant, which may interfere with fit or the ability to properly clean the system and surrounding mouth area.

Accordingly, a system is desired for securely retaining dentures in place while allowing for easy cleaning and release of the dentures as desired. In addition, it may be desired that the system be adaptable and adjustable for use in mouths of different dimensions. It may also be desirable that the system be adapted and adjustable within the same mouth as physiological characteristics of that mouth may change over time.

SUMMARY OF THE INVENTION

In one embodiment, an adjustable denture retention system is disclosed, which is adapted to retain a denture in position of a mouth of a patient. The denture retention system may comprise at least one implant adapted for implanting in a maxillary or jaw bone of a patient, said implant including a receiver. The system may further include an elongated baseplate including a first baseplate aperture elongated in a direction along a longitudinal axis of the baseplate. The denture retention system may further comprise at least one fastener adapted to pass through the baseplate aperture at any of a plurality of longitudinal positions along the first baseplate aperture and into the receiver of the at least one implant, said at least one fastener further adapted to secure the baseplate at a plurality of relative positions with respect to the at least one implant, wherein said plurality of relative positions are located along the direction of the longitudinal axis of the baseplate.

In one aspect, the denture retention system may further comprise at least one spacer adapted for at least partial insertion in the receiver of the implant and between the at least one implant and the elongated baseplate. A bottom of the elongated baseplate may be adapted to be in direct contact with a top of the spacer when the at least one fastener passes through the baseplate aperture and the spacer and is fixed to the implant.

In another aspect, the at least one implant may comprise two implants, each adapted for implanting along one side of the maxillary or jaw bone of the patient, and the at least one fastener may comprise two fasteners, each adapted to secure the elongated baseplate to a respective one of the two implants. Each of the two fasteners may be adapted to pass through the first baseplate aperture at different longitudinal positions along the first baseplate aperture. The system may further include a second baseplate aperture, wherein a first of the two fasteners is adapted to pass through the first baseplate aperture into a first of the two implants, and a second of the two fasteners is adapted to pass through the second baseplate aperture into a second of the two implants.

The elongated baseplate may be ferromagnetic or may comprise a ferromagnetic material. The system may further include at least one denture, said denture including at least one magnet adapted to align with the elongated baseplate in the mouth of the patient, thereby securing the denture in a fixed relative position within the mouth of the patient.

In a further aspect, the first baseplate aperture may be defined by an outwardly inclined wall. The at least one fastener may comprise a retainer screw with a retainer head, wherein the retainer head comprises an exterior inclined wall. The exterior inclined wall of the retainer head may be adapted to nest snugly with the outwardly inclined wall of the first baseplate aperture, thereby retaining the elongated baseplate in one of the plurality of longitudinal positions.

In another embodiment, an adjustable denture retention system may be adapted to retain a denture in position with respect to tissue of a mouth of a patient. The denture retention system may comprise at least one implant adapted for implanting in a maxillary or jaw bone of a patient, said implant including a receiver. At least one spacer may be provided, said spacer being adapted for at least partial insertion in the receiver of the implant. In addition, an elongated baseplate may be provided, said baseplate including a baseplate aperture. At least one fastener may be adapted to pass through the baseplate aperture, through the at least one spacer, and into the receiver of the at least one implant so as to secure the baseplate at a fixed location with respect to the at least one implant while said elongated baseplate is in direct contact with a top of the at least one spacer. The at least one spacer may have a spacer height such that the at least one spacer is adapted to contact the baseplate at a location above the tissue of the mouth of the patient.

In one aspect, the at least one spacer may comprise a plurality of spacers, each of said plurality of spacers having a different respective spacer height. Each of the plurality of spacers may be adapted for insertion into the receiver of the at least one implant. Upon insertion into the receiver, each of the plurality of spacers may be adapted to contact the baseplate at a different height with respect to the at least one implant.

In another aspect, the at least one fastener may comprise a retainer screw including a retainer head, a retainer tail, and a retainer spacer therebetween. The retainer tail may comprise exterior threads adapted to engage interior threads of the receiver of the implant. The baseplate aperture may be defined by an outwardly inclined wall. The retainer head may comprise an exterior inclined wall, and the exterior inclined wall of the retainer head may be adapted to nest snugly with the outwardly inclined wall of the baseplate aperture, thereby retaining the elongated baseplate in the fixed location. The retainer spacer may be adapted to pass through at least a portion of the at least one spacer between the at least one implant and the elongated baseplate.

In a further embodiment, an adjustable denture retention system adapted to retain a denture in position with respect to a mouth of a patient may comprise at least one endosseous or osseointegrated implant adapted for implanting in an alveolar arch of a maxillary or jaw bone of a patient. The system may further include an elongated ferromagnetic baseplate adapted to be releasably attached to the at least one implant at a plurality of locations in a direction along a longitudinal axis of the baseplate by way of at least one retainer screw. Furthermore, the system may comprise a denture including at least one magnet, said denture adapted to align with said alveolar arch such that the at least one magnet aligns with the baseplate, thereby retaining the denture in a fixed position within the mouth of the patient.

In one aspect, the at least one endosseous or osseointegrated implant may comprise two endosseous or osseointegrated implants adapted to be implanted on a single lateral side of the alveolar arch. The at least one retainer screw may comprise two retainer screws, each of the two retainer screws being adapted to attach the baseplate to a respective one of the two endosseous or osseointegrated implants. The at least one magnet may comprise two magnets longitudinally offset from one another and located within a cavity of the denture at a location corresponding to the alveolar arch of the patient when the two magnets are aligned with the baseplate in the mouth of the patient.

BRIEF SUMMARY OF THE DRAWINGS

FIGS. 2A-2L are perspective views of a method of installing the denture retention system of FIG. 1;

FIGS. 6A-6C are a first baseplate of the denture retention system of FIG. 1;

FIGS. 7A-7C are a second baseplate of the denture retention system of FIG. 1;

DETAILED DESCRIPTION OF THE INVENTION

The description provided below and in regard to the figures applies to all embodiments unless noted otherwise, and features common to each embodiment are similarly shown and numbered.

Figure 1:
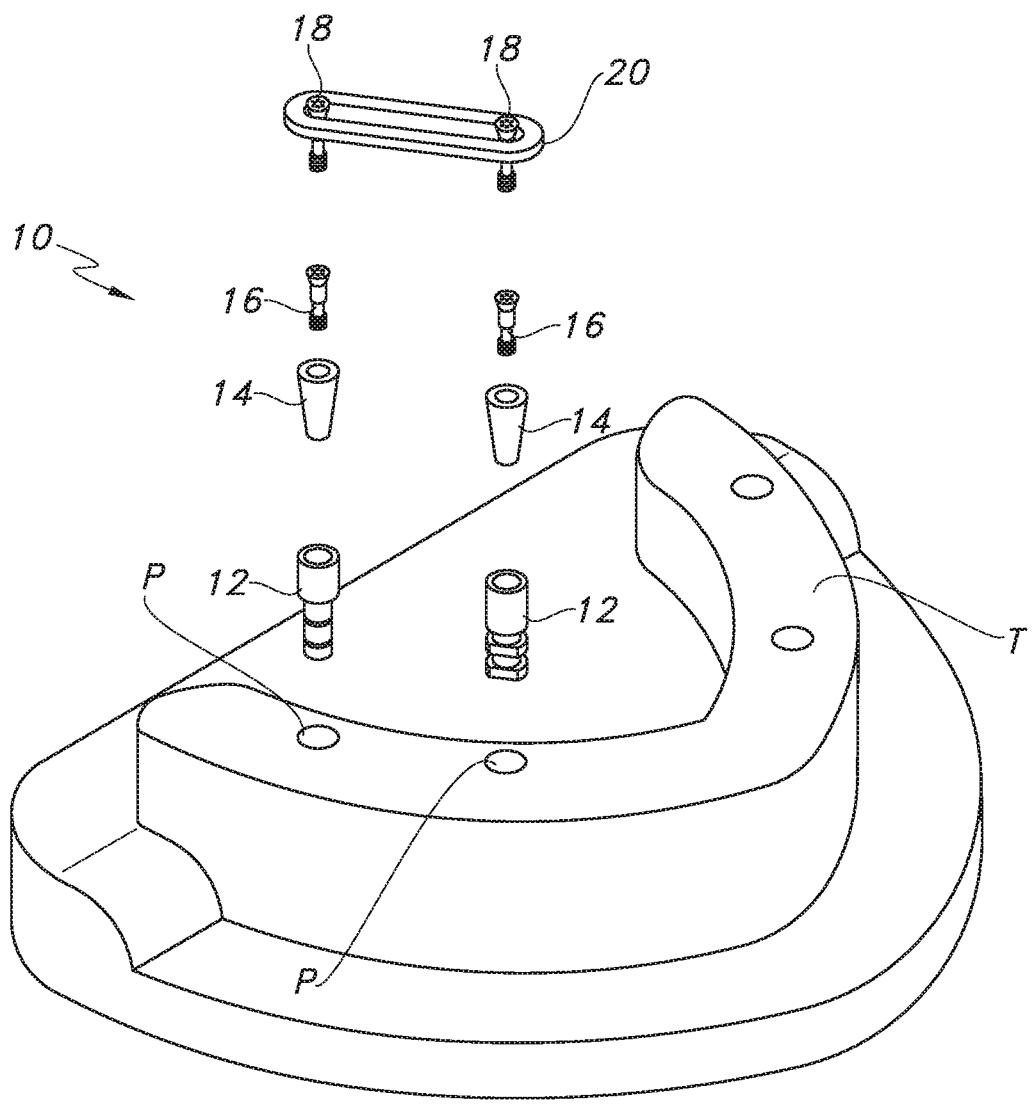
FIG. 1 is an exploded view of an adjustable denture retention system of the present invention.

FIG. 1 illustrates an adjustable denture retention system 10 adapted to retain magnetic dentures in place. The system includes one or more implants 12 adapted for being implanted through pilot holes P in tissue T and retained in bone, such as the mandible or maxillary bone of a patient. The implants 12 may comprise endosseous implants or osseointegrated implants, which may include pores or apertures into which osteoblasts and supporting connective tissue may migrate in order to secure the implant in place in the bone. In one aspect, the implants may include external threading adapted to assist in retention of the implant in the bone upon insertion.

In another aspect, the implants 12 may comprise an implant receiver, such as an internally threaded aperture, adapted to at least partially receive a spacer 14. The spacer 14 may comprise an elongated tubular element adapted to be at least partially inserted into the implant 12. In one aspect, the spacer 14 may be referred to as a healing base, as it may be adapted to allow for the tissue T to heal around the spacer after the implants 12 have been implanted.

As is described in further detail below, the spacer 14 may be adapted to be retained at least partially within the implant 12 by a first fastener, such as a healing screw 16. The healing screw 16 may be inserted through the tubular element of the spacer 14 and into the implant receiver. The healing screw 16 may include external threads which may be adapted for engaging internal threads within the implant 12, thereby retaining the spacer 14 in position with respect to the implant 12.

As will be described in further detail below, the system 10 may further include a baseplate 20, which may be secured to the spacer(s) 14 and implant(s) 12 via one or more fasteners, such as retainer screws 18. The retainer screws 18 may function similarly to the healing screws 16, and may be adapted to retain the baseplate 20 to the spacer(s) 14 and implant(s) 12 by way of external threads adapted to engage the internal threads of the implant(s) 12 within the implant receiver. The baseplate 20 may comprise a ferromagnetic metal, and may be adapted to engage a magnet associated with dentures as outline in further detail below.

With further reference to FIGS. 2A-2L, a method of installing the denture retention system 10 is illustrated in further detail. A dentist, periodontist, endodontist, or oral surgeon (collectively referred to as "dentist" herein) may perform a comprehensive examination on a patient, including clinical examination and a digital panoramic radiograph in order to determine the nature and extent of dentures required. A plurality of implants 12 may be identified for implantation. In one aspect, the system includes the implantation of four implants 12 in the relevant alveolar arch (either upper or lower) to be fitted for dentures. This may involve two implants 12 in each of the left and right side of the relevant alveolar arch. Placement of said implants 12 and use of the system 10 may preserve bone and tissue structure in the patient. If necessary, mandibular teeth may be extracted to allow for implantation. Four implants 12 as described herein may ease the load on the respective alveolar arch ridge and may distribute occlusal forces during mastication.

In another aspect, the system may include the implantation of two implants 12 on a single side of a single alveolar arch (e.g. the left side or the right side) of the patient to be fitted for dentures. This may allow for a partial denture to be retained on a single side of the patient's mouth.

Specific location and placement of the implants 12 may be at the discretion of the dentist. This location may be based on the amount of bone available in the relevant locale on the patient. For example, the implants may be located along a midline of the maxillary or jaw bone of the patient and optimally spaced from a front and back of the relevant bone if said bone is symmetric and follows a normal physiological maxillary or jaw bone line. Preferably the implants are spaced at least one tooth spacing apart from one another. In one aspect, optimal spacing of the implants may be determined by the size of a patient's mouth in combination with a size of an available aperture of a baseplate 20 as described below. In one embodiment, at least one implant may be close to or in the midline of the maxillary or jaw bone. At least a posterior implant may be adapted for placement within the perimeter of an aperture of the baseplate 20 as outlined below.

If the physiology of the patient is abnormal, whether through bone loss or inherent physiological deviation from normal, the dentist may locate the implants away from the midline, or the implants 12 may be located at a more anterior or posterior location than if the patient had a normal physiological maxillary or jaw bone. The system 10 allows for adjustability in implant location while still allowing for optimal retention of dentures as outlined herein. Similarly, the size of the patient's maxillary or jaw bones may dictate spacing limitations between implants, such as if the patient has a smaller mouth. In such a situation, the system 10 allows for placement of implants 12 at closer or farther locations from one another while still allowing for optimal denture retention.

As illustrated in FIG. 2A, the pilot holes P may be drilled at appropriate locations as identified by the dentist. The implants 12 may be placed in the pilot holes P in a manner so as to facilitate retention in the bone beneath. As shown in FIG. 2B, the implants 12 may be inserted within the pilot holes P to a location below the surface level of the tissue T.

The spacers 14 may then be inserted at least partially into the implant receivers of the implants 12, as illustrated in FIG. 2C. The spacers 14 may be sized such that once placed within the implant receivers of the implants 12, the top of the spacer 14 may be located at a surface level of the tissue T, or just above the tissue level, as illustrated in FIG. 2D. In one aspect, the top of the spacer 14 is located at least one thousandth of an inch above the tissue level. In a further aspect, the top of the spacer 14 is located between 5-10 thousandths of an inch above tissue level. This may allow for placement of the baseplate above the tissue level, as described below.

The size of the spacer 14 may be dictated by a thickness of the tissue T or a distance between the implant 12 and the tissue level. Different patients may have different tissue thicknesses. In addition, a given patent may have tissue thickness that varies over the patient's life based on health, bone thickness or loss, or any other number of factors. Accordingly, the system 10 contemplates spacers 14 of a plurality of different sizes which may be selected at the time of implant based on measurements taken at that time. Furthermore, the size of the spacer 14 may be changed throughout the life of the patient based upon a change in tissue thickness or distance between implant 12 and tissue level. Accordingly, the system 10 contemplates adjustability for differences in tissue thickness between patients and for a given patient over said patient's life, while allowing for a constant or normalized spacing between the patient's tissue level and the top of the spacer 14.

Figure 3:
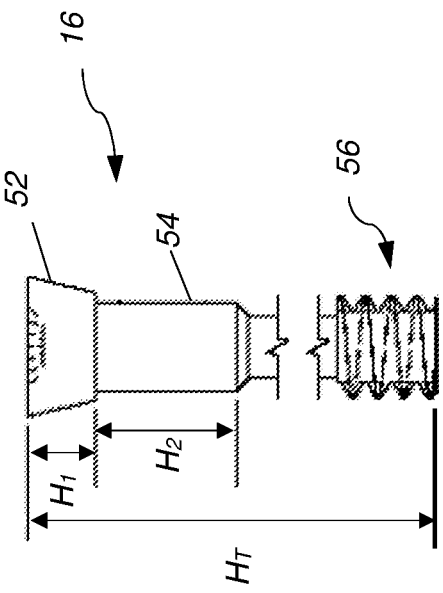
FIG. 3 is a spacer of the denture retention system of FIG. 1.

With further reference to FIG. 3, the spacer 14 is illustrated in further detail. The spacer 14 may be generally tubular in shape and may include a spacer aperture 40, which may be adapted for receiving the healing screw 16 and the retainer screw 18, as discussed below. The spacer 14 may include a spacer head 44, which may be adapted to engage the tissue T when in place. After the spacer 14 has been inserted, the tissue T may heal around the spacer, thereby facilitating retention. The spacer head 44 may include an outwardly inclined exterior wall, such that a lower portion of the outwardly inclined exterior wall may be at least partially inserted into the implant 12 and may be retained therein by compression upon insertion of the healing screw 16 or retainer screw 18. This engagement between the spacer 14 and the implant 12 may prevent contamination, such as bacterial contamination, by forming a seal between the spacer 14 and the implant 12.

Figure 5:
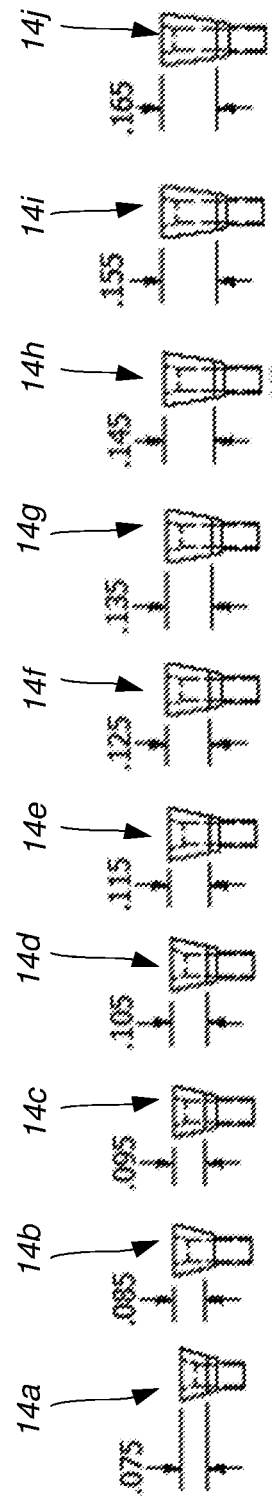
FIG. 5 is a series of spacers of the denture retention system of FIG. 1.

As illustrated in FIG. 5, the system 10 may comprise spacers 14a-14j of a plurality of different sizes. The size of the spacer may be chosen such that the top of the spacer is at the desired height with respect to the tissue level upon insertion into the implant 12. The spacer head 44 of the various spacers 14a-14j may vary in length, such that the spacer head may generally correspond to a given tissue thickness of a patient. As illustrated, the spacer head 44 may range in height from 0.075 inches to 0.165 inches. It is understood that this spacer head size may be larger or smaller than this range, as may be dictated by a patient's tissue thickness.

Figure 2F:
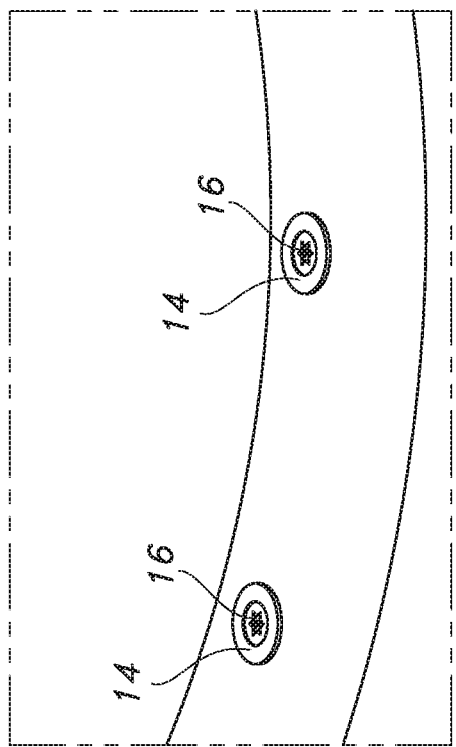
Figure 2E:
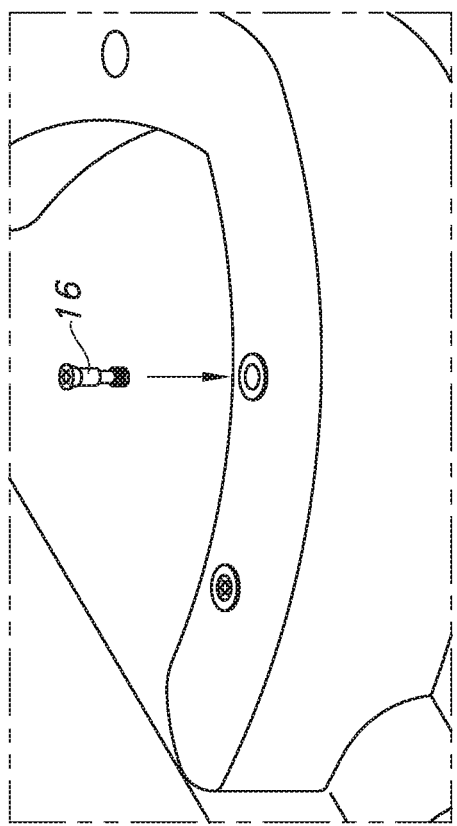

Turning to FIG. 2E, the first fastener, or healing screw 16, may be inserted into the spacer 14 at the time of implant in order to retain the spacer 14 in place during the healing process, as the bone heals around the implant and the tissue heals around the spacer. As illustrated in FIG. 2F, once in place, the top of the healing screw 16 may level with the top of the spacer 14.

Figure 4:
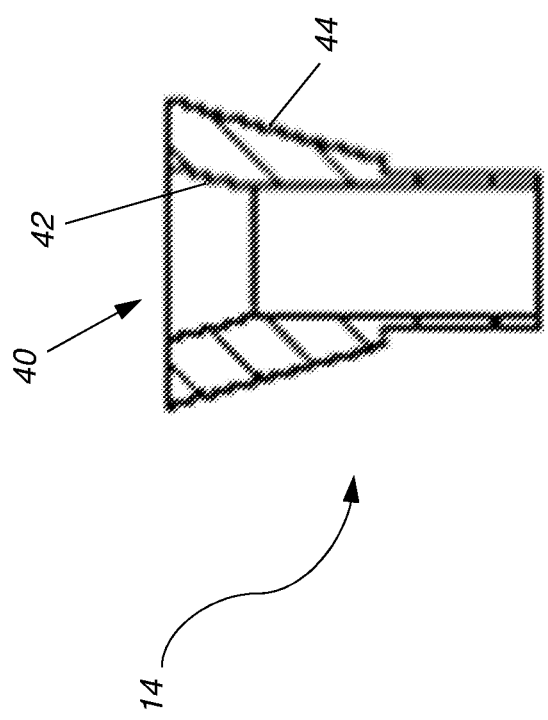
FIG. 4 is a healing screw of the denture retention system of FIG. 1.

With further reference to FIG. 4, the healing screw 16 is illustrated in further detail. The healing screw 16 may include a screw head 52, which may include an exterior inclined wall. Upon insertion into the spacer 14, the screw head 52 may rest against a complementary interior inclined wall 42 of the spacer 14. The interior inclined wall 42 of the spacer may define a cavity corresponding in size to the screw head 52. For example, the healing screw 16 may include a screw head height $H_1$ which may correspond to a height of cavity defined by the interior inclined wall 42. The coordination of inclined walls between the healing screw 16 and the spacer 14 may limit or prevent contamination, such as bacterial contamination, by forming a seal between the spacer 14 and the healing screw 16.

The healing screw 16 may further include a body 54 that may be generally cylindrical in shape and may be adapted for insertion into a generally cylindrical portion of the spacer aperture 40. The body height $H_2$ of the healing screw 16 may generally correspond to a height of the cylindrical portion of the spacer aperture 40.

In one aspect, the healing screw 16 may include a screw tail 56 which may be adapted for engaging the implant 12 for retention thereto. For example, the screw tail 56 may include external threads adapted for engaging interior threads within the implant receiver of the implant 12. The healing screw 16 may comprise Titanium (Ti-6AL-4v) and may include a thread size of 1.6 mm and a 0.035 pitch.

The healing screw 16 may define a total screw height $H_t$ from the top of the head 52 to the bottom of the tail 56. The total screw height $H_t$ may be determined by the size of the spacer 14. For example, in the case of a patient with thicker tissue T, a taller spacer 14 may be chosen as discussed above, and therefore a healing screw 16 with a longer total screw height $H_t$ may be selected. And in the case of a patient with thinner tissue T, a shorter spacer 14 may be chosen, and therefore a healing screw 16 with a shorter total screw height $H_t$ may be selected. Accordingly, the system 10 contemplates a plurality of healing screws 16 of different total screw heights $H_t$, each coordinating in height with one of the plurality of spacer sizes 14a-14j in order to accommodate a plurality of tissue thicknesses.

After implantation, the implants 12, spacers 14, and healing screws 16 may be left in the patient for a period of time for healing, such as four to six months. During this healing time, the bone may heal around and in the implants 12 while the tissue T heals around the spacers 14. The dentist may then take an impression of the patient's mouth, including the spacer 14 and healing screw. This impression may be used for creation of the dentures to be placed in the patient's mouth as outlined below.

Figure 2G:
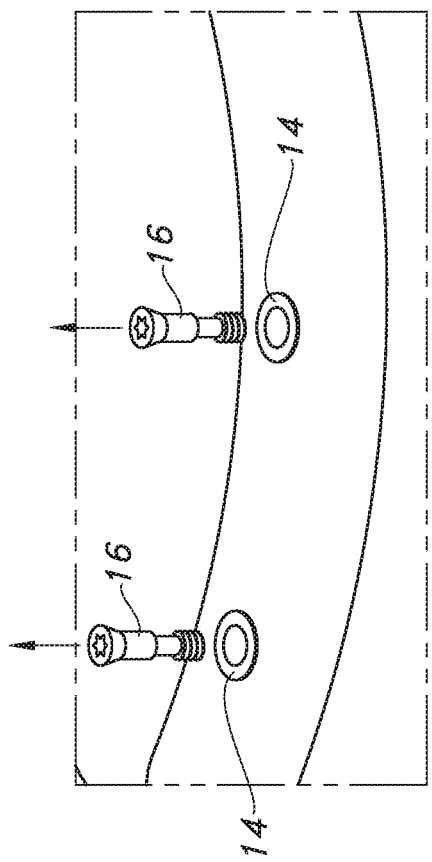
Figure 2I:
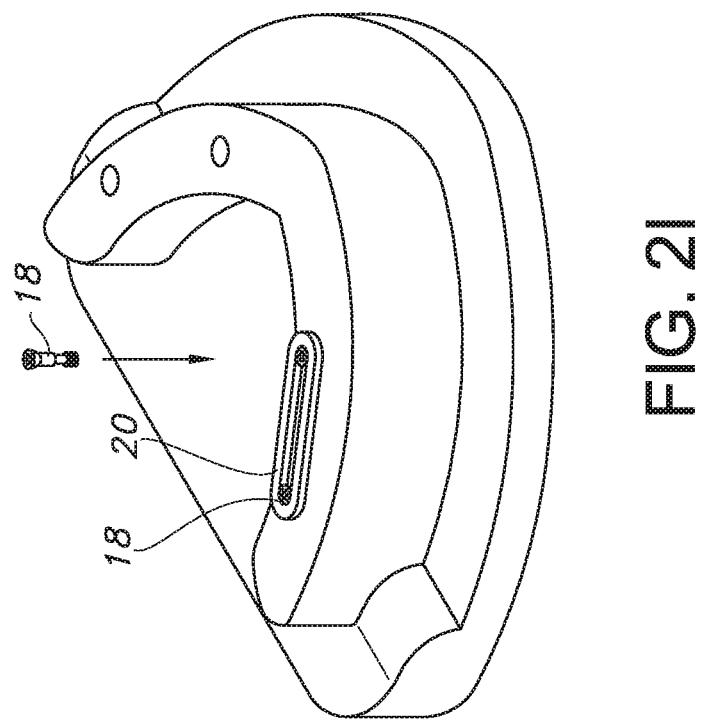
Figure 2H:
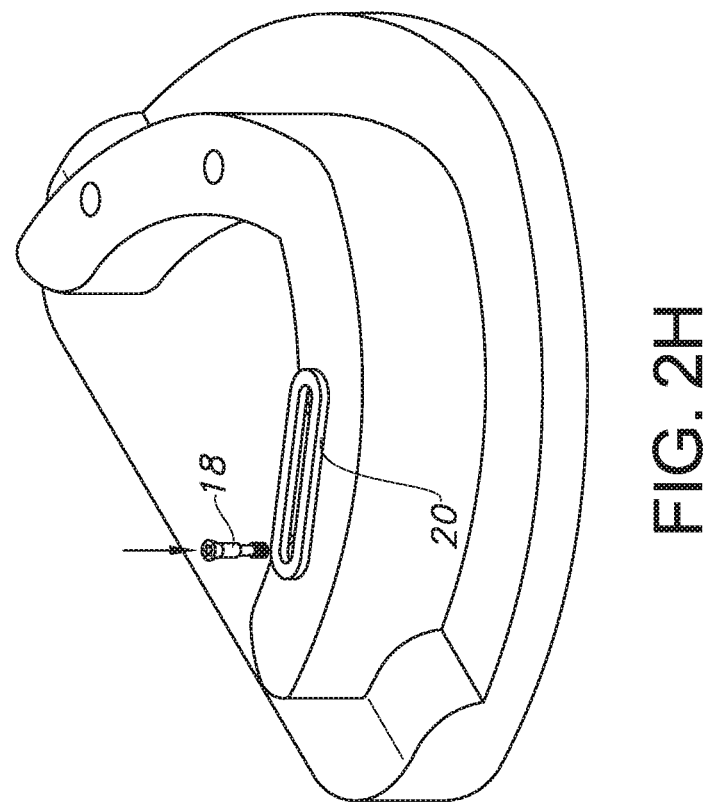

After healing, the healing screws 16 may be removed from the spacers 14 as illustrated in FIG. 2G. The healed tissue T may temporarily retain the spacers 14 within the tissue after removal of the healing screws. A baseplate 20 may then be selected for placement in the patient's mouth as illustrated in FIG. 2H. In one aspect, the baseplate length may extend approximately 75% of a length of the alveolar arch of the patient from a mesial to a distal end.

The baseplate 20 may include at least one baseplate aperture 60, as shown in FIG. 6A-6C. The baseplate aperture 60 may comprise an elongated slot, said elongated slot being elongated in a longitudinal direction along the baseplate 20. The baseplate aperture 60 may have a length $L_1$, wherein said length L1 may be selected to correspond to a length of a side of the alveolar arch of the patient. The aperture 60 may be defined by an inclined wall 62.

Turning back to FIGS. 2H and 2I, one or more second fasteners, such as retainer screws 18, may be placed through the aperture 60 of the baseplate 20, through a given spacer 14 and into the implant receiver of the implant 12 below. The retainer screws 18 may therefore be adapted to retain the baseplate 20 in contact with spacers 14, such that the bottom of the baseplate 20 rests on and is secured to the top of the spacers 14. In the embodiment of the top of the spacer 14 being secured slightly above the tissue level, such as at least one thousandth of an inch above the tissue or between 5-10 thousandths of an inch above tissue level, the baseplate will therefore be secured within the mouth without touching the tissue itself.

Figure 9:
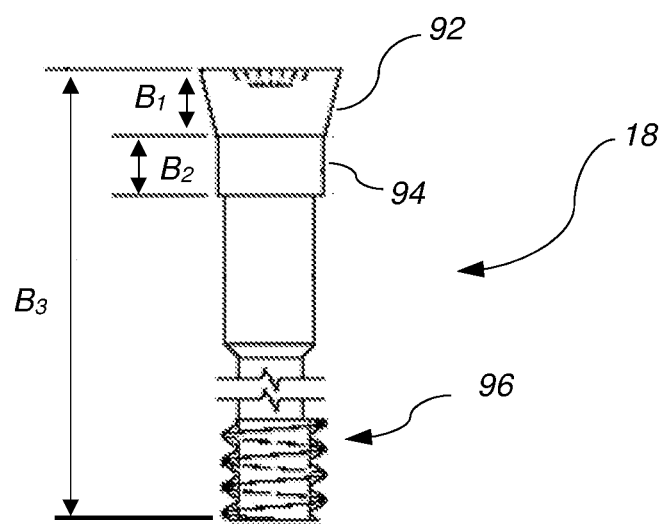
FIG. 9 is a retainer screw of the denture retention system of FIG. 1.

Turing to FIG. 9, the retainer screw 18 is illustrated in further detail. Much like the healing screw, the retainer screw 18 may include a retainer head 92 with an exterior inclined wall. The retainer screw 18 may further include a retainer spacer 94 there below, and a retainer tail 96 further below. The retainer tail 96 may include external threads adapted to engage the internal threads of the implant receiver of the implant 12. In one aspect, the retainer screw 18 may comprise a thread size of 1.6 mm and 0.035 pitch. The retainer screw may comprise titanium (Ti-6AL-4v).

The retainer head 92 may be adapted to engage the inclined wall 62 of the aperture 60 of the baseplate 20 upon insertion, thereby providing a snug fit therebetween. The height $B_1$ of the retainer head 92 may correspond to a height of the baseplate 20 or may be slightly less than the height of the baseplate, such that the retainer head 92 is level with or below the top of the baseplate 20 once secured.

The retainer spacer 94 may have a height $B_2$ which may correspond to the height of cavity defined by the interior inclined wall 42 of the spacer 14. The retainer screw 18 may define a total height $B_3$ from a top of the retainer head 92 to the bottom of the retainer tail 96. This total height $B_3$ may vary, depending on the size of the spacer 14 selected for use in the patient's mouth. Much like with the healing screw 16, the system 10 contemplates a plurality of retainer screws 18 of different total heights $B_3$, each corresponding to a different one of the different sized spacers 14a-14j.

With further reference to FIGS. 6A-8, different baseplate sizes and configurations may be available for patients with different physiological characteristics, for different desired strength of denture retention, and depending on whether or not a single implant or multiple implants have been used for a given baseplate location. The baseplate may comprise a ferromagnetic metal. In one aspect, the metal may be similar to UNS G10180 or soft material steel 1030 grade. The baseplate may have two coatings—an inner layer of nickel and an outer coating of chromium. The metal may comprise a bio compatible chrome coating which may be ISO 10933 compliant.

In a first example, the baseplate 20 of FIGS. 6A-6C includes a single baseplate aperture 60 with a length $L_1$. The baseplate 20 of this configuration may come with aperture lengths $L_1$ that may range from shorter to longer, such as between 0.69 to 0.95 inches. These baseplates may have corresponding total lengths of between 0.94 to 1.20 inches. The length $L_1$ of the baseplate aperture 60 (and the corresponding overall baseplate length) may be of any relevant length, being constrained by the size of a patient's mouth.

In one aspect, the system provides for two baseplates 20 of different total lengths and different aperture lengths $L_1$. A first baseplate may have a total length of 0.94 inches, with an aperture length of 0.69 inches. A second baseplate may have a total length of 1.20 inches and an aperture length of 0.95 inches. These different sized baseplates 20 allow for adjustability of total length, based on a patient's mouth size, as well as adjustability within the patient's mouth based on different aperture sizes allowing for various distances between implants. For example, a patient with a larger mouth may require the first baseplate (because it is longer), while a patient with a smaller mouth may require the second baseplate (because it is shorter). Regardless of the size of the first or second baseplate, the retention of the baseplate within the mouth and the retention of the dentures to the baseplate as described herein may be accomplished in the same manner.

Turning to FIGS. 7A-7C, a second baseplate 22 is illustrated, which includes a first baseplate aperture 70a and a second baseplate aperture 70b. These first and second baseplate apertures 70a and 70b may be elongated slots, and may be defined by inclined walls 72. These inclined walls 72 may be inclined and sized much like the baseplate 20 of FIGS. 6A-6C so as to be adapted to receive and be retained by the retainer screws 18. The elongated slots may allow for adjustability of baseplate location within a patient's mouth, as the baseplate 22 may be located at any location in which the underlying implants may be located underneath the two baseplate apertures 70a, 70b. The first and second baseplate apertures 70a, 70b may be aligned in a direction aligning with a longitudinal axis of the baseplate 22. In one aspect, the baseplate 22 may be centered along a line between the implants 12. There may be solid baseplate material between the first and second baseplate apertures 70a, 70b, thereby providing more ferromagnetic material in the baseplate for engaging with the magnets of the dentures, and thereby providing a stronger force of attraction.

Figure 8:
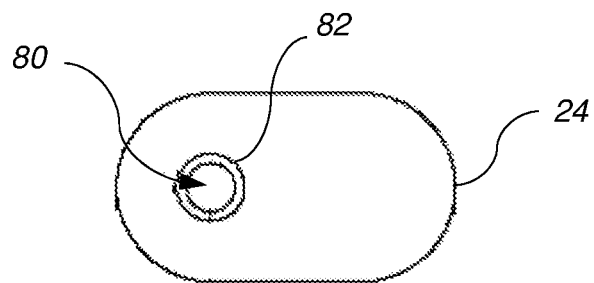
FIG. 8 is a third baseplate of the denture retention system of FIG. 1.

With further reference to FIG. 8, a third baseplate 24 is illustrated. This baseplate 24 includes only a single aperture 80 defined by an inclined wall 82. The inclined wall may be inclined and sized much like those of the first and second baseplates 20, 22, in order to receive and be retained by a retainer screw 18. The single aperture 80 may be circular and may be adapted to snugly receive a single retainer screw 18. This third baseplate may allow for use of the system 10 in a patient's mouth that is only able to receive a single implant, such as for physiological reasons. Alternately, this third baseplate 24 may allow a patient who has previously had a single implant, but who is unable or unwilling to undergo further surgery to place a second implant.

Figure 10A:
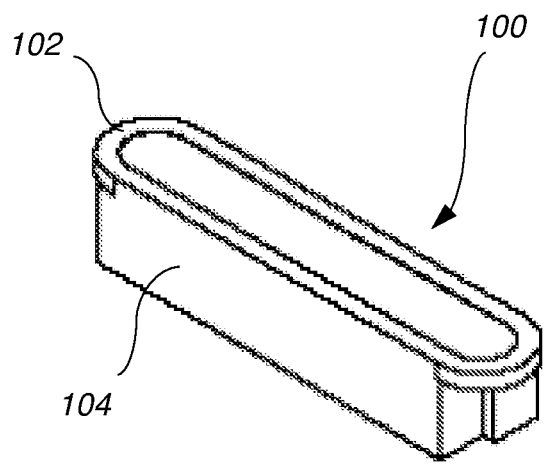
FIGS. 10A-10C are a mold used to create the dentures for use with the denture retention system of FIG. 1.
Figure 10B:
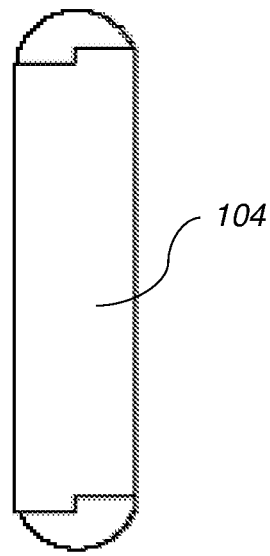
Figure 10C:
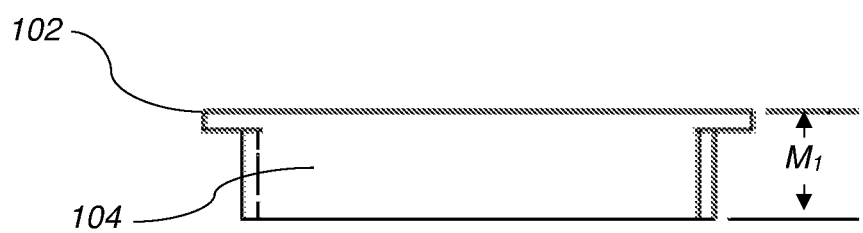

Once a baseplate has been selected, a corresponding mold for the baseplate and magnets may be selected for the fabrication of the dentures as discussed below. This mold is used to locate the baseplate and magnets as they will be located with respect to the dentures themselves when in use. With reference to FIGS. 10A-10C, the mold 100 is illustrated, which may comprise a baseplate blank portion 102 and a magnet blank portion 104. Because the baseplate and the magnets will be in contact with one another when the dentures are in use, the mold 100 includes blanks for both elements as a single piece.

The size and shape of the mold will depend entirely on the type of baseplate selected and the desired magnet configuration. The baseplate blank portion 102 will generally approximate or be identical to the size and shape of the selected baseplate. The magnet blank portion 104 may be shaped so as to reflect the magnet configuration desired during use. As illustrated, the magnet blank portion 104 resembles two linearly offset cuboids. This is because one preferred embodiment of the magnets linearly offsets two cuboid shaped magnets as described below.

The impressions taken by the dentist prior to placement of the baseplate as outlined above may be used by the party fabricating the dentures. First, the impressions may be boxed and poured (such as with stone) and then trimmed appropriately in order to create a model mouthpiece which is a reproduction of a relevant portion of the patient's mouth with the spacers 14 in place. The selected mold 100, representing the baseplate and the magnets together, may be placed on the model mouthpiece at the location over the implants and spacers, where the baseplate will be located when in use. The mold 100 may be lightly waxed around its edges to maintain proper position of the mold 100. Model dentures may then be created to fit the model mouthpiece, said model dentures including a cavity in the shape of the mold 100. These model dentures may be created according to established procedures in the art, with the difference being the inclusion of the cavity in the shape of the mold 100.

In some instances, it is important for the dentist to be able to make any necessary adjustments to ensure proper fit. In one example, a duplicate set of model dentures may be created. The duplicate set may be made of hydrocolloid or silicone material then poured using a strong stone. When the models are set the lab can make record bases with wax rims on them. These may be sent back to dentist for a patient try-in visit. Necessary adjustments may be made for form and function, and the wax rims may be contoured to achieve proper lip support and occlusal plane. The jaw relation and vertical dimension of occlusion (VDO) may be established at this time.

Next a bite registration material may be applied between indexed rims to set the position. These models may then be sent back to fabrication lab. The lab may then mounts the casts on an articulator using the dentists contoured rims and bite. The mounted case is now ready for teeth to be set in wax. The wax denture can then be sent back to the dentist to be verified for form and function with the patient before final processing.

The festooned wax denture bases may be transformed into acrylic to make a final denture. This may be done by using the wax denture as a pattern to make a mold into which the denture acrylic is packed and cured. The wax denture base may be invested and then the wax may be eliminated, forming a mold into which acrylic is packed. This is called the "open-pack" method. The fabrication lab may then seal the boarders of the wax denture down with hot wax and clean the teeth free of any wax. The mountings may be knocked off the articulator and the models may be trimmed appropriately to fit into denture flasks. The denture flasks may include four pieces: (1) the drag, which contains the cast under which is (2) a round, knock-out plate, (3) the cope, and (4) the cap. The inside surface of the flask may be lightly coated with Vaseline.

Flasking may be done in three steps. In the first step the cast is secured to the drag of the flask with stone. The stone may be smoothed so that no undercuts exist on the surface. Stone separating media may be applied to all stone surfaces. In the second stage the cope of the flask is put in place and stone is poured to the occlusal surfaces of the teeth. The tips of the teeth may be exposed in the stone to help with de-flasking. Stone separating media may again be applied to stone surface. The final stage is accomplished when the top portion of the flask is poured and while the stone is still soft the lid placed on the flask. In one aspect, all three sections may be made in stone and painted with a separating medium after set, thereby allowing all parts to separate more easily.

Now that the dentures have been flasked, the wax may be eliminated to form a mold into which acrylic may be packed. This is done by placing the flask in boiling water, which softens the wax. The flask will pop open and the wax is flushed out with a stream of water. The molds are then cleaned with a detergent or wax solvent using a soft brush. Clean boiling water is then used to flush the molds. The molds are then clean and ready to be coated, such as with tinfoil substitute, while still warm. The tinfoil substitute may be painted over the complete mold surface to prevent the acrylic from sticking to the stone. A small brush is used to get around the teeth but avoid getting it on the teeth. Now that the molds have been coated, they are ready to be packed.

To pack the dentures the monomer and polymer are measured following manufacturer's instructions. When the proper consistency of the acrylic is reached, enough of the acrylic may be used to over fill the flask and a piece of polyethylene sheet may be placed over it to "trial-pack". The assembled flask may be placed in a pneumatic press. Eight hundred pounds of pressure may be sufficient for packing a denture. Preferably the pressure does not exceed two thousand pounds. Pressure should be applied gradually to allow the acrylic to flow within the mold. The flask may then be opened. Excess resin may be trimmed beyond the border of the denture. A properly filled mold will be an exact negative of the cast and the acrylic will have a dense appearance. Several trial packs may be necessary to reach this stage. When the denture is dense the sheet is removed and all stone surfaces may be painted with a tin foil substitute. The flask may be re-assembled and placed in a processing clamp and held in place tightly. The flask-clamp assembly may then be placed in a curing unit for processing. Once cooked, the dentures may be de-flasked, trimmed, and polished.

In order to allow for magnetic retention of the dentures to the baseplate in the patient's mount, the magnets 32 must be secured to the dentures 30, as illustrated in FIG. 2J. The magnets 32 may be inserted in the cavity created in the dentures as a result of the mold 100 as described above. The magnets 32 may be secured within the cavity, such as by using a self-cure acrylic or other adhesive to fix the magnets into place making sure a solid seat is maintained. The adhesive for the magnets may be cured in warm water in a pressure pot if needed.

In one embodiment, the magnets may be N42 neodymium rare earth magnets with 4 coatings. The inner most coating may be nickel, the second coating copper, the third coating nickel, and the outer coating gold. The outer gold coating protects the patient from any allergic reaction to metal sensitivity. Open-field aluminum-nickel-cobalt magnets have been used in prosthodontics for many years, but success has been limited because these magnets are susceptible to corrosion by the saliva and because their retentive force is weak relative to the initial retention offered by mechanical attachments. More recently, magnets have been made from alloys of the rare earth elements samarium and neodymium, which provide stronger magnetic force per unit size. In addition, a new generation of laser-welded containers has improved protection from salivary corrosion. The current resurgence of interest in this type of attachment appears justified because, unlike mechanical attachments, magnets have potential for unlimited durability and may therefore be superior to mechanical ball or bar attachments for the retention of removable prostheses on implants. The corrosive concerns of the saliva may be addressed by the additional coatings of nickel, copper, and gold.

The magnets may be appropriately sized to correspond to the size of the baseplate. In one aspect, the magnets may be of 2 sizes, one short and one long, to correspond with baseplates of different sizes. The magnet strength (i.e. "pull force") is relative to the size and placement of the magnet in relation to the baseplate 20. Placement of two magnets in each side of the denture may be important to the retention strength of the denture.

Selectively orienting magnets 32 within the dentures 30 may allow for customizable magnetic strength between dentures 30 and baseplate 20. As described above and as illustrated in FIGS. 11 and 12, the magnets 32 may be cuboidal in shape, and more specifically may be elongated cuboids. Once the magnets have been oriented to account for north and south poles, a proper arrangement of magnets may be established for a given desired magnetic strength. As will be understood, opposite poles attract one another, such that north pole of one magnet will naturally be drawn to the south pole of the second magnet.

Figure 11:
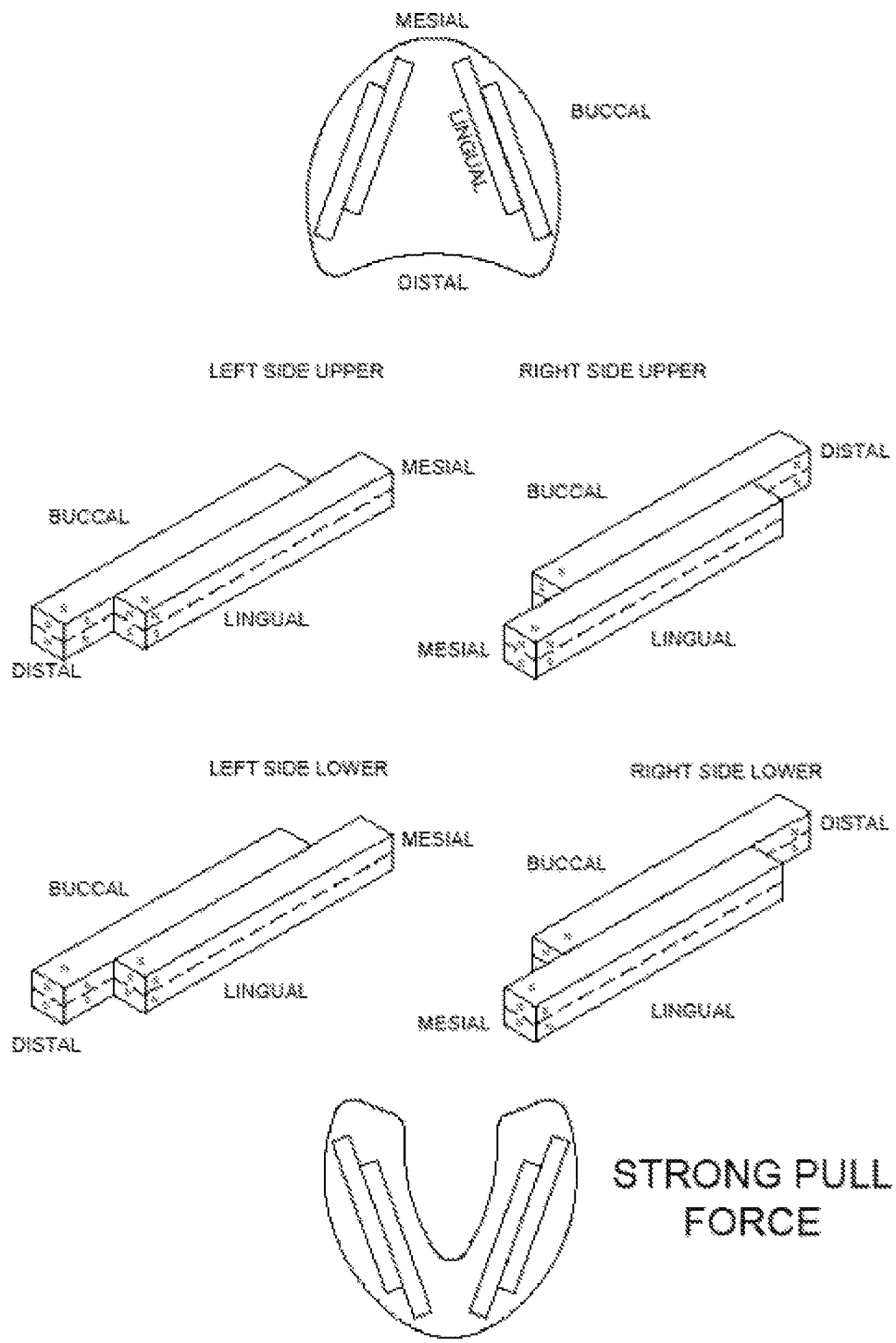
FIGS. 11 and 12 illustrate various magnet configurations for the dentures to be used with the denture retention system of FIG. 1.
Figure 12:
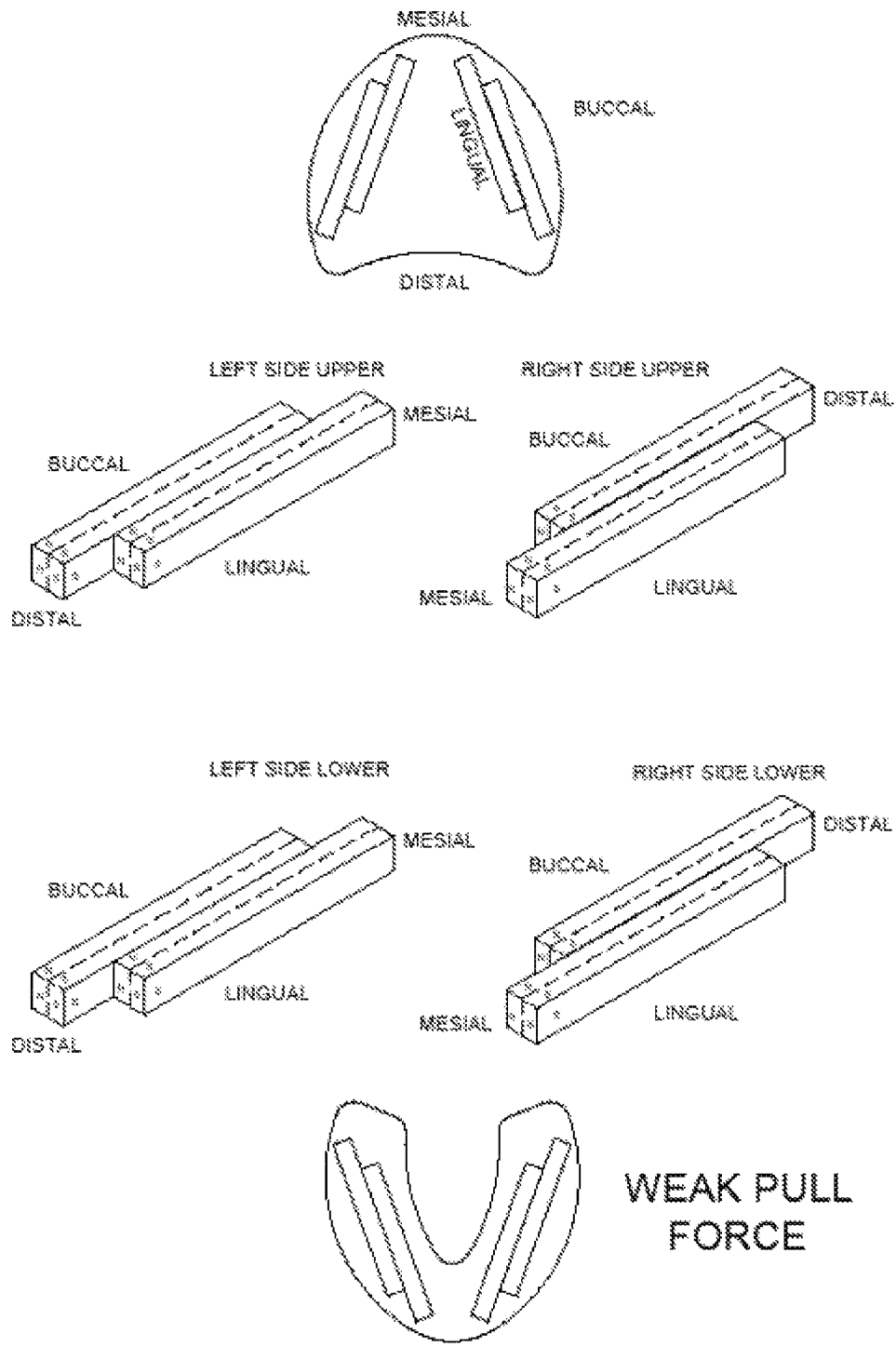

As illustrated in FIGS. 11 and 12, the magnets 32 may be offset from one another in a longitudinal direction. For example, a first magnet, which is to be located on a lingual side may be offset more to the front or mesial portion of the denture, while the second magnet, which is to be located on a buccal side may be offset more toward the distal portion of the denture. This configuration should match the shape of the magnet blank portion 104 of the mold 100. Such a configuration provides the patient with the strongest magnetic strength against the baseplate 20 when in position in the patient's mouth. This configuration additionally allows for a degree of lengthening of the overall magnet positioning in a longitudinal direction within the dentures, thereby providing a greater length of interaction between magnet and baseplate within the mouth. This elongated length for magnetic attraction spreads the magnetic force along the maxillary or jaw bone from front to back, thereby evenly and longitudinally dispersing the force of attraction with the dentures. This dispersal of magnetic attraction along the length of the magnet and baseplate provides for more stable retention of the dentures as compared to a discrete point retention scheme.

The specific orientation of a pair of magnets 32 with respect to each other at a given mouth location may also assist in customizing the desired magnetic strength between magnets and baseplate. As illustrated in FIG. 11, the corresponding north and south poles of a pair of magnets may both face the same direction (e.g. north and south poles both face up and down upon assembly within the dentures). This sort of arrangement may provide a strong magnetic strength or a strong pull force between the magnets 32 and the baseplate. A strong magnetic strength is desirable from a retention standpoint. In addition, the orientation of magnets illustrated in FIG. 11 creates repelling magnetic forces between upper and lower dentures so as to prevent the patient's mouth from being magnetically shut. Specifically, as shown in FIG. 11, the right side upper magnet on the lingual side has a north pole facing downward, while the right side lower magnet on the lingual side has a north pole facing upward. Similarly, the right side upper magnet on the buccal side has a south pole facing downward, while the right side lower magnet on the buccal side has a south pole facing upward. Accordingly, the corresponding upper and lower pairs of magnets on a given side of the mouth repel one another. This repelling force is significantly weaker than the attraction force between each pair of magnets and its corresponding baseplate precisely because the magnets are adapted to directly contact the baseplates, while the upper and lower pairs of magnets on a given side of the mouth would have denture material between them so that they would never contact one another. Nevertheless, this relatively weak repelling force prevents the dentures from sticking together.

In some instances, it may be desirable to have stable, but slightly weaker magnetic strength between a magnet pair and the baseplate. For example, in an elderly patient or a patient with less strength, the magnetic strength provided by the configuration of FIG. 11 may prove challenging for the patient to remove the dentures. Accordingly, the magnets may be oriented as illustrated in FIG. 12, which will provide stable magnetic strength between each magnet pair and its respective baseplate while still allowing an individual with less strength the ability to remove the dentures. In this orientation, the same relative placement of magnets within each magnet pair is used (i.e. with each lingual magnet displaced toward the mesial or front of the mouth with respect to each buccal magnet. However, the poles of each magnet pair are arranged such that opposite poles of each magnet pair face each other. Accordingly, the strongest magnetic attraction is between the magnets themselves, while the "sides" of each magnet (i.e. the faces of each cuboidal shape which include both north and south poles)

face the baseplate during use. Again, the orientation illustrated creates a slight repellant magnetic affect between upper and lower dentures for the reasons noted above.

Once the magnets 32 have been oriented and fixed as desired in the dentures 30, the dentures may simply be placed in the mouth in the proper orientation as illustrated in FIGS. 2K-2L. Accordingly, the system 10 allows for stable and adjustable denture retention without the use of daily denture adhesive.

Overall, the magnetic denture system 10 described herein provide orofacial support for the loss of the hard and soft tissues. This system 10 may help with facial aesthetics, phonetics, and collapse of vertical dimensions. The stability and retention of these dentures decreases bone loss in the residual ridges. Furthermore, these implant-supported dentures eliminate replacement of worn parts, use of an adhesive, and decreases office visits to the dentist and surgeon. Once the endosseous osseointegrated implants are placed under the removable prosthesis, the system provides retention, stability, adjustability, and good occlusal support.

As can be appreciated, the current system provides a number of important adjustability features that may not be present in other denture systems. First, the baseplate aperture(s) allow for front-to-back adjustment of the position of the baseplate, both upon initial placement, and if such adjustment is required over the life of the patient.

Secondly, the use of a baseplate, especially with an elongated aperture, allows for the use of the same sized baseplate in different sized mouths and in mouths in which implants are placed at different positions and at different distances from one another. This aids in keeping production costs lower, as the same baseplate may be used across a number of different patients, thereby preventing the need for fabricating customized baseplates for individual patients.

Thirdly, the system contemplates a plurality of different spacers of different sizes, thereby allowing for customization of the height of the baseplate above the implants (and therefore above the tissue level) without the need for extensive surgery for new implants. This is first important from a production standpoint, as the spacer may be relatively easily constructed (as opposed to an endosseous osseointegrated implant), so a variety of tissue thicknesses across different patients may be accommodated with different spacers as opposed to requiring different sized implants. In addition, the tissue thickness or bone thickness (and hence, in either case, the distance between implant and tissue surface level) may change in a given patient over that patient's life. Therefore, in a given patient, one spacer may be replaced with a spacer of a different size to accommodate this different tissue thickness or bone thickness over the life of the patient, while allowing the patient to continue using the system without requiring a new invasive implant surgery. Spacer replacement may require a minor incision in the soft tissue of the gingiva or gums, but would allow the original implant to be used, thereby avoiding the significant healing time required for bone implants. This adjustability of the height of the baseplate is important as it allows for optimal spacing between the baseplate and tissue in order to promote proper health and hygiene.

And finally, the magnets of the disclosed system are part of the dentures as opposed to the magnets themselves being implanted in the patient. The only implanted element is essentially a receiver used to retain one or more ferromagnetic baseplates which can be exchanged and moved essentially at will. The fact that the magnets are not in the patient also allows for the magnets to be exchanged or reoriented as described above without affecting the patient at all. The magnets may simply be removed from the dentures and reoriented, may be replaced if damaged, or may be exchanged for a different type of magnet for any reason at little to no physical intrusion on the patient.

The invention claimed is:

1. An adjustable denture retention system adapted to retain a denture in position of a mouth of a patient, said denture retention system comprising:
   at least two implants adapted for implanting in a maxillary or jaw bone of a patient, each of said at least two implants including a receiver;
   an elongated baseplate including a baseplate aperture elongated in a direction along a longitudinal axis of the baseplate and extending through the baseplate from a top of the baseplate to a bottom of the baseplate, wherein the elongated baseplate is ferromagnetic, and wherein the elongated baseplate is elongated in the direction along the longitudinal axis with symmetric ends;
   at least two fasteners, each of the at least two fasteners adapted to simultaneously pass through the baseplate aperture at any of a plurality of longitudinal positions along the baseplate aperture and into the receiver of a respective one the at least two implants, each of said at least two fasteners further adapted to secure the baseplate at a plurality of relative positions with respect to the at least two implants, wherein said plurality of relative positions are located along the direction of the longitudinal axis of the baseplate; and
   at least one denture, said denture including at least one magnet adapted to align with the elongated baseplate in the mouth of the patient, thereby securing the denture in a fixed relative position within the mouth of the patient.

2. The denture retention system of claim 1, further comprising at least one spacer adapted for at least partial insertion in the receiver of at least one of the implants and between the at least one of the implants and the elongated baseplate.

3. The denture retention system of claim 2, wherein the bottom of the elongated baseplate is adapted to be in direct contact with a top of the spacer when at least one of the fasteners passes through the baseplate aperture and the spacer and is fixed to the respective implant.

4. The denture retention system of claim 1, wherein the at least one magnet comprises two magnets longitudinally offset from one another and located within a cavity of the denture at a location corresponding to the alveolar arch of the patient when the two magnets are aligned with the baseplate in the mouth of the patient.

5. The denture retention system of claim 1, wherein the baseplate aperture is defined by an outwardly inclined wall;
   wherein the at least two fasteners comprise retainer screws, each with a retainer head, said retainer head comprising an exterior inclined wall; and
   wherein the exterior inclined wall of the retainer head of each of the at least two fasteners is adapted to nest snugly with the outwardly inclined wall of the baseplate aperture, thereby retaining the elongated baseplate in one of the plurality of longitudinal positions.

6. An adjustable denture retention system adapted to retain a denture in position with respect to tissue of a mouth of a patient, said denture retention system comprising:
   a plurality of implants adapted for implanting in a maxillary or jaw bone of a patient, each of said implants including a respective receiver;

a plurality of spacers, each of the spacers adapted for at least partial insertion in the receiver of a respective one of the implants;

an elongated baseplate elongated along a longitudinal axis and having symmetric ends, the elongated baseplate including a baseplate aperture extending through the elongated baseplate from a top of the baseplate to a bottom of the baseplate; and a plurality of fasteners, each of the fasteners adapted to simultaneously pass through the baseplate aperture, through the at least one of the plurality of spacers, and into the respective receiver of at least one implant of the plurality of implants so as to secure the baseplate at a fixed location with respect to the at least one implant of the plurality of implants while said elongated baseplate is in direct contact with a top of at least one spacer of the plurality of spacers;

wherein the at least one spacer of the plurality of spacers has a spacer height such that the at least one spacer of the plurality of spacers is adapted to contact the baseplate at a location above the tissue of the mouth of the patient.

7. The denture retention system of claim 6, wherein each of said plurality of spacers has a different respective spacer height.

8. The denture retention system of claim 7, wherein each of the plurality of spacers is adapted for insertion into the respective receiver of the at least one implant of the plurality of implants, and wherein, upon insertion into the respective receiver, each of the plurality of spacers is adapted to contact the baseplate at a different height with respect to at least one implant of the plurality of implants.

9. The denture retention system of claim 6, wherein each of the plurality of fasteners comprises a retainer screw including a retainer head, a retainer tail, and a retainer spacer therebetween, wherein the retainer tail comprises exterior threads adapted to engage interior threads of the respective receiver of the implant of the plurality of implants.

10. The denture retention system of claim 9, wherein the baseplate aperture is defined by an outwardly inclined wall;
wherein the retainer head comprising an exterior inclined wall; and
wherein the exterior inclined wall of the retainer head is adapted to nest snugly with the outwardly inclined wall of the baseplate aperture, thereby retaining the elongated baseplate in the fixed location.

11. The denture retention system of claim 10, wherein each of the retainer spacers is adapted to pass through at least a portion of a respective one of the plurality of spacers between a respective one of the plurality of implants and the elongated baseplate.

12. An adjustable denture retention system adapted to retain a denture in position with respect to a mouth of a patient, said denture retention system comprising:

at least two endosseous or osseointegrated implants adapted for implanting in an alveolar arch of a maxillary or jaw bone of a patient;

a ferromagnetic baseplate elongated along a longitudinal axis and including symmetric ends, the baseplate including a longitudinally elongated aperture extending from a top of the baseplate to a bottom of the baseplate, the baseplate adapted to be releasably attached to the at least two implants via at least two retaining screws simultaneously passing through the aperture at a plurality of locations in a direction along a longitudinal axis of the baseplate; and a denture including at least one magnet, said denture adapted to align with said alveolar arch such that the at least one magnet aligns with the baseplate, thereby retaining the denture in a fixed position within the mouth of the patient.

13. The denture retention system of claim 12, wherein the at least two endosseous or osseointegrated implants are adapted to be implanted on a single lateral side of the alveolar arch, and wherein the at least two retainer screws are adapted to attach the baseplate to a respective one of the at least two endosseous or osseointegrated implants.

14. The denture retention system of claim 13, wherein the at least one magnet comprises two magnets longitudinally offset from one another and located within a cavity of the denture at a location corresponding to the alveolar arch of the patient when the two magnets are aligned with the baseplate in the mouth of the patient.

* * * * *